(12) United States Patent
Koyama

(10) Patent No.: US 7,448,698 B2
(45) Date of Patent: Nov. 11, 2008

(54) BRAKE FLUID PRESSURE CONTROL ACTUATOR

(75) Inventor: Fumitoshi Koyama, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 334 days.

(21) Appl. No.: 11/208,620

(22) Filed: Aug. 23, 2005

(65) Prior Publication Data
US 2006/0055232 A1     Mar. 16, 2006

(30) Foreign Application Priority Data
Sep. 14, 2004  (JP) ............... 2004-266637
Dec. 22, 2004  (JP) ............... 2004-371539

(51) Int. Cl.
*B60T 13/16* (2006.01)

(52) U.S. Cl. ............ 303/10; 303/119.2; 303/116.4

(58) Field of Classification Search ......... 303/DIG. 10, 303/119.2, 116.4
See application file for complete search history.

(56) References Cited

U.S. PATENT DOCUMENTS

| | | | |
|---|---|---|---|
| 4,940,294 A * | 7/1990 | Foster | 303/115.4 |
| 5,244,262 A * | 9/1993 | Kehl et al. | 303/119.3 |
| 5,362,141 A * | 11/1994 | Beck et al. | 303/119.3 |
| 5,460,438 A * | 10/1995 | Hellmann et al. | 303/119.3 |
| 5,464,187 A * | 11/1995 | Linkner, Jr. | 248/635 |
| 5,577,813 A * | 11/1996 | Zaviska | 303/116.4 |
| 6,270,170 B1 * | 8/2001 | Isogai et al. | 303/119.3 |
| 6,398,315 B1 * | 6/2002 | Dinkel et al. | 303/113.1 |
| 6,428,121 B1 * | 8/2002 | Dinkel et al. | 303/191 |
| 6,443,537 B2 * | 9/2002 | Koyama | 303/119.3 |
| 6,616,248 B2 * | 9/2003 | Obuse et al. | 303/119.3 |
| 6,688,707 B1 * | 2/2004 | Dinkel et al. | 303/119.3 |
| 6,846,050 B2 * | 1/2005 | Inoue et al. | 303/119.3 |
| 6,969,128 B2 * | 11/2005 | Sekihara | 303/113.1 |
| 7,004,552 B2 * | 2/2006 | Takumori et al. | 303/116.4 |
| 7,011,380 B2 * | 3/2006 | Meyer | 303/119.3 |
| 7,118,183 B2 * | 10/2006 | Hinz et al. | 303/119.3 |

FOREIGN PATENT DOCUMENTS

DE     10245068 A1 *  4/2004
JP     A-11-208440    8/1999

* cited by examiner

*Primary Examiner*—Robert A. Siconolfi
*Assistant Examiner*—James K Hsiao
(74) *Attorney, Agent, or Firm*—Posz Law Group, PLC

(57) ABSTRACT

Pressure regulating reservoirs are positioned in an upper portion of a housing, and pumps are positioned below the pressure regulating reservoirs. More specifically, the pressure regulating reservoirs are positioned in an upper portion of the housing so as to provide installation space in a lower portion of the housing. This installation space is used for positioning the pumps, and as a result it is possible to locate the pumps as far as possible toward the bottom of the housing.

9 Claims, 13 Drawing Sheets

BRAKE FLUID PRESSURE CONTROL ACTUATOR

CROSS REFERENCE TO RELATED APPLICATION

This application is based upon and claims the benefit of Japanese Patent Applications No. 2004-266637 filed on Sep. 14, 2004 and No. 2004-371539 filed on Dec. 22, 2004, the content of which are incorporated herein by reference.

FIELD OF THE INVENTION

The present invention relates to a brake fluid pressure control actuator that is used for vehicle brake fluid pressure control, for example, in ABS control or traction control.

RELATED ART OF THE INVENTION

A brake fluid pressure control actuator adjusts the pressure of each wheel cylinder (hereinafter referred to as "W/C") in order to perform, for example, ABS control in which the tendency of a wheel to lock up is inhibited by controlling the W/C pressure to increase or decrease. A plurality of electromagnetic valves, a pump, and a reservoir are attached to the brake fluid pressure control actuator, thus enabling it to adjust the W/C pressure by driving the plurality of electromagnetic valves and the pump (for example, refer to Japanese Patent Laid-Open Publication No. 11-208440).

FIGS. 12 and 13 show an example of a known brake fluid pressure control actuator. FIG. 12 shows a front view of the layout of the brake fluid pressure control actuator, and FIG. 13 shows the layout of the brake fluid pressure control actuator from the right side of FIG. 12.

The brake fluid pressure control actuator is installed to a vehicle such that the up-down direction of the drawing sheets of FIGS. 12 and 13 is the same as the actual vertical direction of the vehicle.

As can be seen from FIGS. 12 and 13, the brake fluid pressure control actuator has an aluminum housing (block) J1, a motor J2 and a case J3 those are attached to the housing J1.

The housing J1 is formed with conduits which constitute a passage (not shown) for performance of brake fluid pressure control, and houses a plurality of control valves J4 connected to the passage, pumps J5 that are driven by the motor J2, dampers J6, and reservoirs J7.

The plurality of control valves J4 are positioned in a row at the front side of the housing J1. More specifically, the plurality of control valves J4 are positioned in three rows, with the top row including two control valves J4, and the rows beneath including four control valves J4, respectively. The plurality of control valves J4 are positioned in the housing J1 such that they are all substantially upwards from the center thereof.

The pumps J5 are provided at either side of a central position of the housing J1, and are driven by a drive shaft of the motor J2, which is fixed to the rear side of the housing J1.

The dampers J6 are disposed at the left and right sides of the housing J1 so as to overlap with the plurality of control valves J4. Further, the reservoirs J7 are disposed at a bottom surface of the housing J1.

The housing J1 is provided with a port J8 that connects the passage with a master cylinder (hereinafter referred to as "M/C"), not shown, and four ports J9 that connect the passage with W/Cs, not shown. The port J8 connected to the M/C is formed in an upper portion of a rear surface of the housing J1, and the four ports J9 connected to the W/Cs are formed in a row in a top surface of the housing J1.

The above configuration is representative of that used in known brake fluid pressure control actuators. With this configuration, when the brake fluid in the M/C is sucking up by the pumps J5, and, for example, used to pressurize the W/Cs, the brake fluid in the M/C is sucked up to the pumps J5 along the route shown by the arrows within FIG. 13.

The above type of brake fluid pressure control actuator is positioned at a predetermined position within the vehicle, and the M/C that supplies brake fluid to the brake fluid pressure control actuator is also positioned at a predetermined position in the vehicle. Accordingly, a height of the installation position of the M/C and a height of the installation position of the brake fluid pressure control actuator are both determined by a specific height of the vehicle.

Given this, the relationship between the fluid levels (head) of the M/C and the reservoirs J7 and the pumps J5 is as shown in FIG. 14.

However, with the above configuration, the reservoirs J7 are located at the bottom surface of the housing J1, and the pumps J5 are located at the central position of the housing J1. Accordingly, the fluid level difference (head) between the M/C and the pumps J5 is small. Thus, when self suction pumps that perform brake fluid suction with the assistance of the brake fluid pressure of the upstream side are utilized for the pumps J5, it is difficult to improve the responsiveness of the pressure increase generated by the pumps J5 (hereinafter referred to as the "pressure increase responsiveness"). In particular, at low temperatures when the brake fluid pressure control actuator has not warmed up, the viscosity of the brake fluid is high, and the brake fluid is more difficult to suck up.

SUMMARY OF THE INVENTION

It is an object of the invention to provide a brake fluid pressure control actuator that can improve the pressure increase responsiveness of a pump.

According to a first aspect of the invention, a reservoir is positioned in a vicinity of a port connected to an M/C, and a pump is positioned below the reservoir.

With this configuration, as a result of positioning the reservoir in the vicinity of the port connected to the M/C and the pump below the reservoir, a fluid level difference (head) between the M/C and the pump is large. Accordingly, even if a self suction pump that performs brake fluid suction with the assistance of brake fluid pressure on an upstream side is adopted for the pump, it is possible to utilize the fluid level difference (head) to improve pressure increase responsiveness. In particular, even at low temperatures when the brake fluid pressure control actuator has not warmed up, it is possible to make it easier for brake fluid to be sucked up and improve pressure increase responsiveness.

Note that, with the above configuration, if the reservoir is positioned below the port, a passage running from the port to the pump does not run from a lower level to a higher level, and, in addition, the length of the passage for carrying brake fluid to the pump can be shortened. Accordingly, it is possible to improve the pressure increase responsiveness of the pump.

With this configuration, it is preferable that the reservoir is positioned such that a longitudinal direction thereof is aligned with a direction perpendicular to a front surface of the housing.

By aligning the longitudinal direction of the reservoir with the direction perpendicular to the front surface of the housing, it is possible to shorten the length of the housing in the actual vertical direction. Thus, it is possible to promote size reduction of the housing, and by corollary make the brake fluid pressure control actuator more compact.

Moreover, with this configuration, a cover may be provided that covers a plurality of control valves in the front surface of the housing. Further, the reservoir may be positioned at a front surface-side of the housing, with a portion of the reservoir that protrudes from the housing being housed within the case.

By positioning the reservoir at the front surface-side of the housing and covering the portion that protrudes from the reservoir using the case in this manner, it is possible to reduce the width of the housing, namely, its size in the direction perpendicular to the front surface. Accordingly, it is possible to make the housing more compact, and as a result promote size reduction of the brake fluid pressure control actuator.

Moreover, for example, the reservoir may be positioned at an upper position and the pump may be positioned at a lower position with a row of four pressure increase control valves and a row of four pressure decrease control valves interposed therebetween.

According to the first aspect of the invention, the port connected to the master cylinder is formed in a surface of the housing, and the housing is only fixed at this surface to a bracket. Further, the housing is attached to a vehicle body via the bracket.

When the above configuration is adopted, in order to fix the brake fluid pressure control actuator to the bracket, it is only necessary to, for example, tighten a nut, or the like, provided on a surface of the bracket to which a motor attached to the housing is fixed. To the contrary, it is not necessary to provide any fixing at any other position. Therefore, it is possible to provide a configuration that only requires a small amount of space to be left for inserting tools for fixing purposes.

With this configuration, the port connected to the master cylinder may be formed as two ports at different locations of the housing. The housing may then be fixed to the bracket at a point between the two ports.

The housing may be fixed to the bracket using a configuration in which: (1) the bracket is formed with one of a hole and a slit, (2) a mount with a hollow central portion is fitted in the hole or slit, and (3) a screw is inserted in the hollow central portion, with the screw being screwed into a female screw hole formed in the housing.

Further, the configuration may include a movement regulation mechanism provided at, at least one of, a bottom surface of the housing and a surface of the bracket that faces the bottom surface of the housing. This movement regulation mechanism regulates movement of the housing with respect to the bracket in a direction parallel to a bottom surface of the housing.

Further, with this configuration it is possible to not only fix the housing to the bracket, but also regulate the movement of the housing with respect to the bracket in the direction parallel to the bottom surface of the housing.

The configuration may be such that, for example, the movement regulation mechanism is provided with: a protrusion formed on the bottom surface of the housing; a holding portion formed in the bracket; and a mount which is positioned between the protrusion and the holding portion and into which the protrusion is inserted.

If this configuration is adopted, the protrusion and the holding portion may be kept apart by the mount.

Accordingly, it is possible to inhibit operation vibration of the brake fluid pressure control actuator from being transmitted to the bracket.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
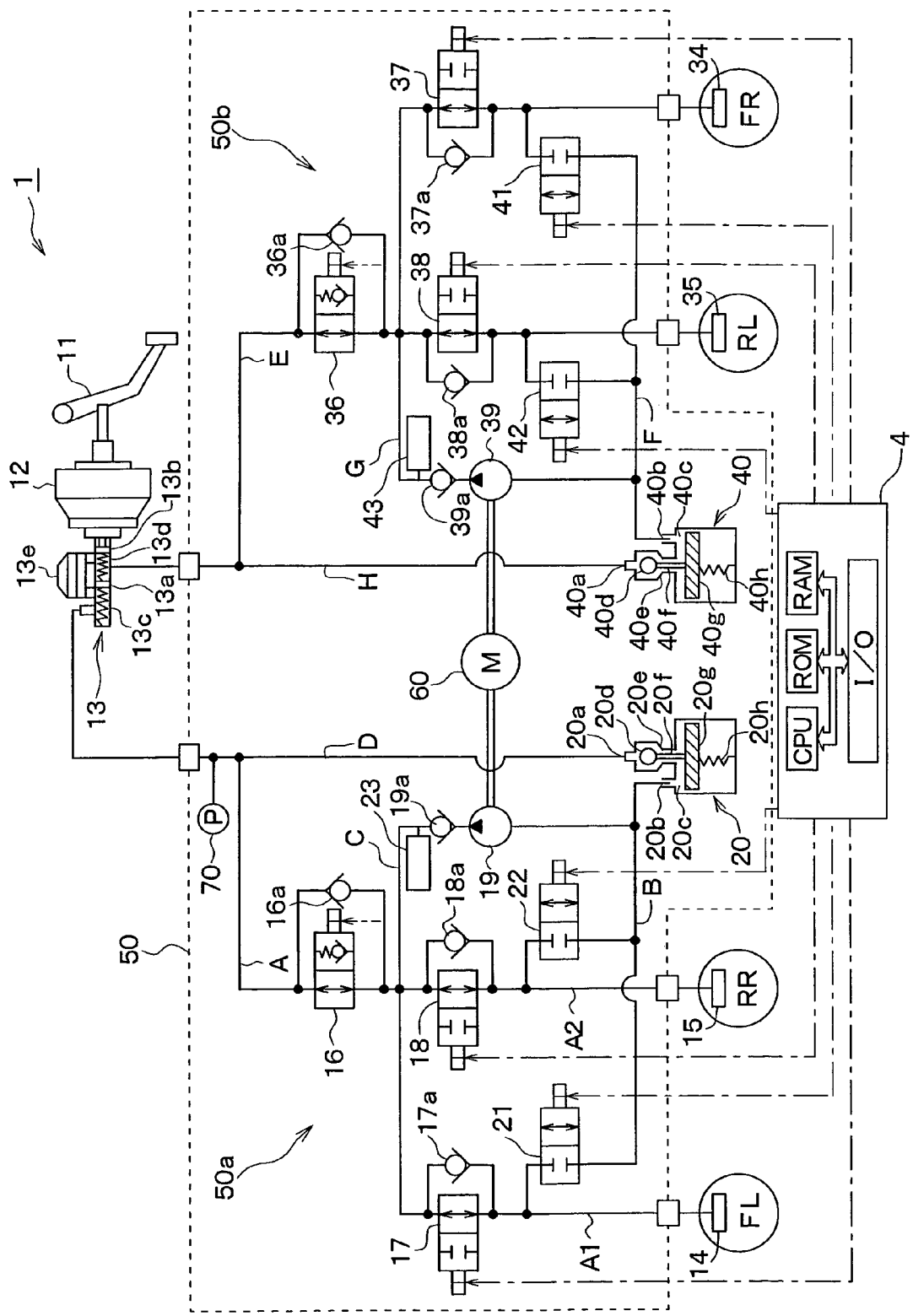
FIG. 1 shows the overall configuration of a brake fluid pressure control system of a first embodiment of the present invention.

The present invention will be described further with reference to various embodiments in the drawings.

First Embodiment

FIG. 1 shows the overall configuration of a brake fluid pressure control system 1 including a brake fluid pressure control actuator 50 to which a first embodiment of the present invention is applied. First, the overall brake fluid pressure control system will be explained.

Hereinafter, the configuration of the brake fluid pressure control system 1 will be explained.

A brake pedal 11 that acts as a brake operating member is depressed by a driver to apply braking force to a vehicle. This brake pedal 11 is connected to an M/C 13 and a booster 12 that functions as a brake fluid pressure generating source. When the driver depresses the brake pedal 11, the booster 12 increases the depression force, and pushes master pistons 13a and 13b disposed within the M/C 13. As a result, the same M/C pressure is generated in a primary chamber 13c and a secondary chamber 13d that are divided from each other by the master pistons 13a and 13b.

The M/C 13 is provided with a master reservoir 13e that has passages that connect with the primary chamber 13c and the secondary chamber 13d, respectively. These passages enable the master reservoir 13e to supply brake fluid to the M/C 13 and store excess brake fluid from the M/C 13. Each passage is formed with a diameter that is extremely small as compared to brake conduit diameters of respective main brake conduits that extend from the primary chamber 13c and the secondary chamber 13d, respectively. Accordingly, an orifice effect is generated when brake fluid flows from the primary chamber 13c and the secondary chamber 13d side of the M/C 13 to the master reservoir 13e.

The M/C pressure generated in the M/C 13 is transmitted to respective W/Cs 14, 15, 34 and 35 via the brake fluid pressure control actuator 50.

The brake fluid pressure control actuator 50 includes a first brake system 50a and a second brake system 50b. The first brake system 50a controls a brake fluid pressure applied to a front left wheel FL and a rear right wheel RR, and the second brake system 50b controls a brake fluid pressure applied to a front right wheel FR and a rear left wheel RL. The two brake systems, namely, the first and second brake systems 50a and 50b, form a diagonal split system.

Hereinafter, the first and second brake systems 50a and 50b will be explained. Since the first and second brake systems 50a and 50b have substantially the same configuration, the explanation here will focus on the first brake system 50a, and a description of the second brake system 50b will be omitted.

The first brake system 50a is provided with a brake conduit A that acts as a main brake conduit for transmitting M/C pressure to the W/Cs 14 and 15 provided on the front left wheel FL and the rear right wheel RR, respectively. The brake conduit A is used to generated W/C pressure in each of the W/Cs 14 and 15.

A first differential pressure control valve 16 configured from an electromagnetic valve that can be controlled to two positions, namely, an open position and a pressure differential position, is provided in the brake conduit A. The first differential pressure control valve 16 is normally placed in the open position when braking is performed. However, when electricity is supplied to the solenoid coil, the valve position switches to the differential pressure position. When the first differential pressure control valve 16 is in the differential pressure position, brake fluid is only permitted to flow to the M/C 13 side from the W/C 14 side and the W/C 15 side when the brake fluid pressure of the W/Cs 14 and 15 becomes greater than the M/C pressure by a predetermined amount or more. As a result, normally, the brake fluid pressure is maintained such that it does not become equal to or greater than the predetermined pressure, whereby the respective brake conduits are protected.

The brake conduit A divides into two branch brake conduits A1 and A2 downstream from the first differential pressure control valve 16 toward the W/Cs 14 and 15. One of the two brake conduits A1 and A2 is provided with a first pressure increase control valve 17 that controls increase of the brake fluid pressure applied to the W/C 14, and the other is provided with a second pressure increase control valve 18 that controls increase of the brake fluid pressure applied to the W/C 15.

The first and second pressure increase control valves 17 and 18 are configured from electromagnetic valves acting as two position valves that can be controlled, respectively, to an opened and a closed position. When the first and second pressure increase control valves 17 and 18 are controlled to the opened position, the M/C pressure, or alternatively a brake fluid pressure generated by discharge of the brake fluid from a pump 19 (described hereinafter) is applied to the W/Cs 14 and 15.

When normal braking is performed as a result of the driver operating the brake pedal 11, the first differential pressure control valve 16 and the first and the second pressure increase control valves 17 and 18 are normally controlled to be opened.

Further, respective check valves 16a, 17a and 18a are provided in parallel with the first differential pressure control valve 16 and the first and the second pressure increase control valves 17 and 18. The check valve 16a of the first differential pressure control valve 16 is provided to enable the M/C pressure to be transmitted to the W/Cs 14 and 15 when the brake pedal 11 is depressed by the driver when the first differential pressure control valve 16 is in the differential pressure position. The check valves 17a and 18a of the pressure increase control valves 17 and 18 are provided to enable the W/C pressure of the front left wheel FL and the rear right wheel RR to be reduced during the driver releases the brake pedal when the pressure increase control valves 17 and 18 are controlled to the closed position by, in particular, ABS control. The above mentioned reduction of the W/C pressure is performed in accordance with the release operation of the brake pedal.

A brake conduit B that acts as a pressure reduction conduit is arranged so as to connect between (i) respective points in the brake conduits A at a portion between the first and the second pressure increase control valves 17 and 18 and each W/C 14 and 15, and (ii) a pressure regulating reservoir 20 having a pressure adjustment valve, described hereinafter. A first pressure decrease control valve 21 and a second pressure decrease control valve 22 that are configured from electromagnetic valves are provided at respective positions in the brake conduit B, and act as two position valves that can be controlled, respectively, to an opened and a closed position. Furthermore, the first and the second pressure decrease control valves 21 and 22 are normally closed when normal braking is performed.

A brake conduit C that acts as a recirculation conduit is arranged so as to connect between the brake conduit A that is the main brake conduit and the pressure regulating reservoirs 20. The pump 19, which can self suction, is provided in the brake conduit C. The pump 19 is driven by a motor 60 so as to be capable of sucking up brake fluid from the pressure regulating reservoirs 20 and discharging it to the M/C 13 side, or alternatively to the W/C 14 side and the W/C 15 side.

It should be noted that a check valve 19a is provided at a discharge port side of the pump 19 so as to inhibit high pressure brake fluid from being applied thereto. Moreover, a fixed displacement damper 23 is provided in the brake conduit C to the discharge side of the pump 19 in order to reduce pulsation of the brake fluid discharged by the pump 19.

A brake conduit D that acts as an auxiliary brake conduit is provided so as to connect between the pressure regulating reservoirs 20 and the M/C 13. The pump 19 sucks up brake fluid from the M/C 13 via the brake conduit D, and discharges it to the brake conduit A. Accordingly, when TCS control or ABS control is being performed, brake fluid can be supplied to the W/C 14 side and the W/C 15 side, whereby the W/C pressure of the corresponding wheel is increased.

The pressure regulating reservoirs 20 are respectively provided with (a) a reservoir opening 20a which is connected to the brake conduit D and through which brake fluid is received from the M/C 13 side, and (b) a reservoir opening 20b which is connected to the brake conduit B and the brake conduit C and through which brake fluid that has escaped from the W/Cs 14 and 15 is received. The reservoir openings 20a and 20b communicate via a reservoir chamber 20c. A ball valve 20d is provided to the inside of the reservoir opening 20a. This ball valve 20d includes a rod 20f, which is formed separately. The rod 20f has a predetermined stroke and moves the ball valve 20d up and down.

Moreover, a piston 20g and a spring 20h are provided in the reservoir chamber 20c. The piston 20g is operatively linked with the rod 20f. The spring 20h pushes the piston 20g to the ball valve 20d side, thus generating a force that discharges the brake fluid from the reservoir chamber 20c.

When a predetermined amount of brake fluid is stored in the above-configured pressure regulating reservoir 20, the ball valve 20d is seated on a valve seat 20e, and the brake fluid in the pressure regulating reservoir 20 is not able to flow out. Accordingly, it is not possible for an amount of brake fluid that exceeds the suction capability of the pump 19 to flow into the reservoir chamber 20c, and thus high pressure is not applied to the suction side of the pump 19.

Further, a pressure sensor 70 is provided between the M/C 13 and the first differential pressure control valve 16 in the brake conduit A. This pressure sensor 70 detects the M/C pressure that is generated in the M/C 13.

As described above, the second brake system 50b has substantially the same configuration as the first brake system 50a. More specifically, the first differential pressure control valve 16 corresponds to a second differential pressure control valve 36; the first and the second pressure increase control valves 17 and 18 correspond respectively to a third and a fourth pressure increase control valve 37 and 38; and the first and the second pressure decrease control valves 21 and 22 correspond respectively to a third and a fourth pressure decrease control valve 41 and 42. The pressure regulating reservoir 20 corresponds to a pressure regulating reservoir 40, the pump 19 to a pump 39, and the damper 23 to a damper 43. Further, the brake conduit A, the brake conduit B, the brake conduit C and the brake conduit D correspond respectively to a brake conduit E, a brake conduit F, a brake conduit G and a brake conduit H. The above described elements collectively form a fluid pressure brake system of the brake fluid pressure control system 1.

Moreover, the brake fluid pressure control system 1 includes the brake control ECU 4 that functions as a control portion. This brake control ECU 4 is a known microcomputer having a CPU, a ROM, a RAM, I/O, and the like, and performs processing, such as various types of calculation processing, in accordance with programs stored in the ROM, and the like.

Electric signals generated by the brake control ECU 4 are used as a basis for controlling the voltage applied to the motor 60 that drives the respective control valves 16 to 18, 21, 22, 36 to 38, 41, 42 and the pumps 19 and 39 of the brake fluid pressure control actuator 50 configured as described above. Accordingly, the W/C pressure generated in the W/Cs 14, 15, 34 and 35 is controlled.

Figure 2:
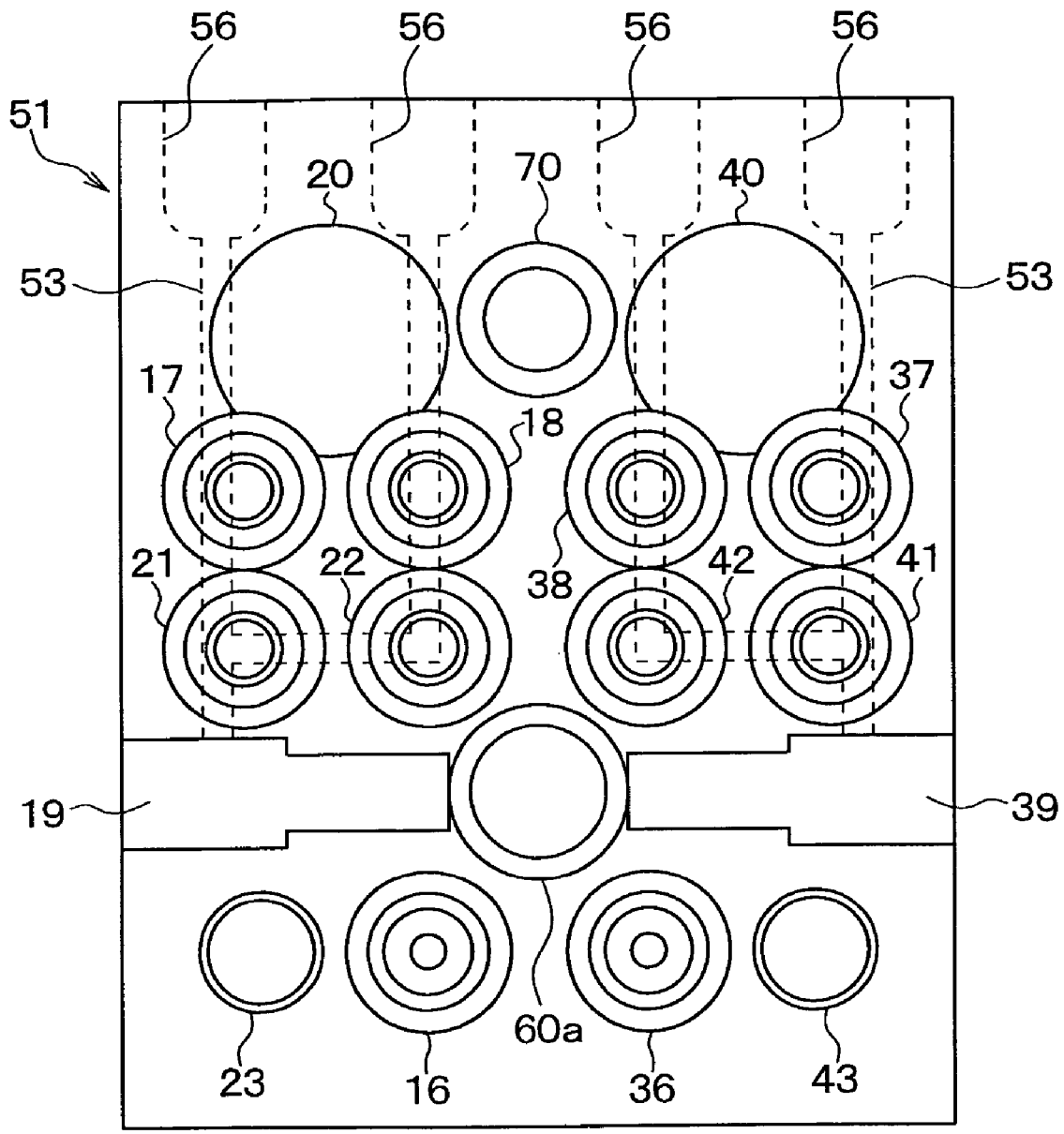
FIG. 2 shows a front view of the layout of a brake fluid pressure control actuator used in the brake fluid pressure control system.

Next, the positioning of each structural element in the brake fluid pressure control actuator 50 including the above-described brake conduit arrangement will be described. FIG. 2 shows a front view of the layout of the brake fluid pressure control actuator 50, and FIG. 3 shows the layout of the brake fluid pressure control actuator 50 when viewed from the right side of FIG. 2.

Figure 3:
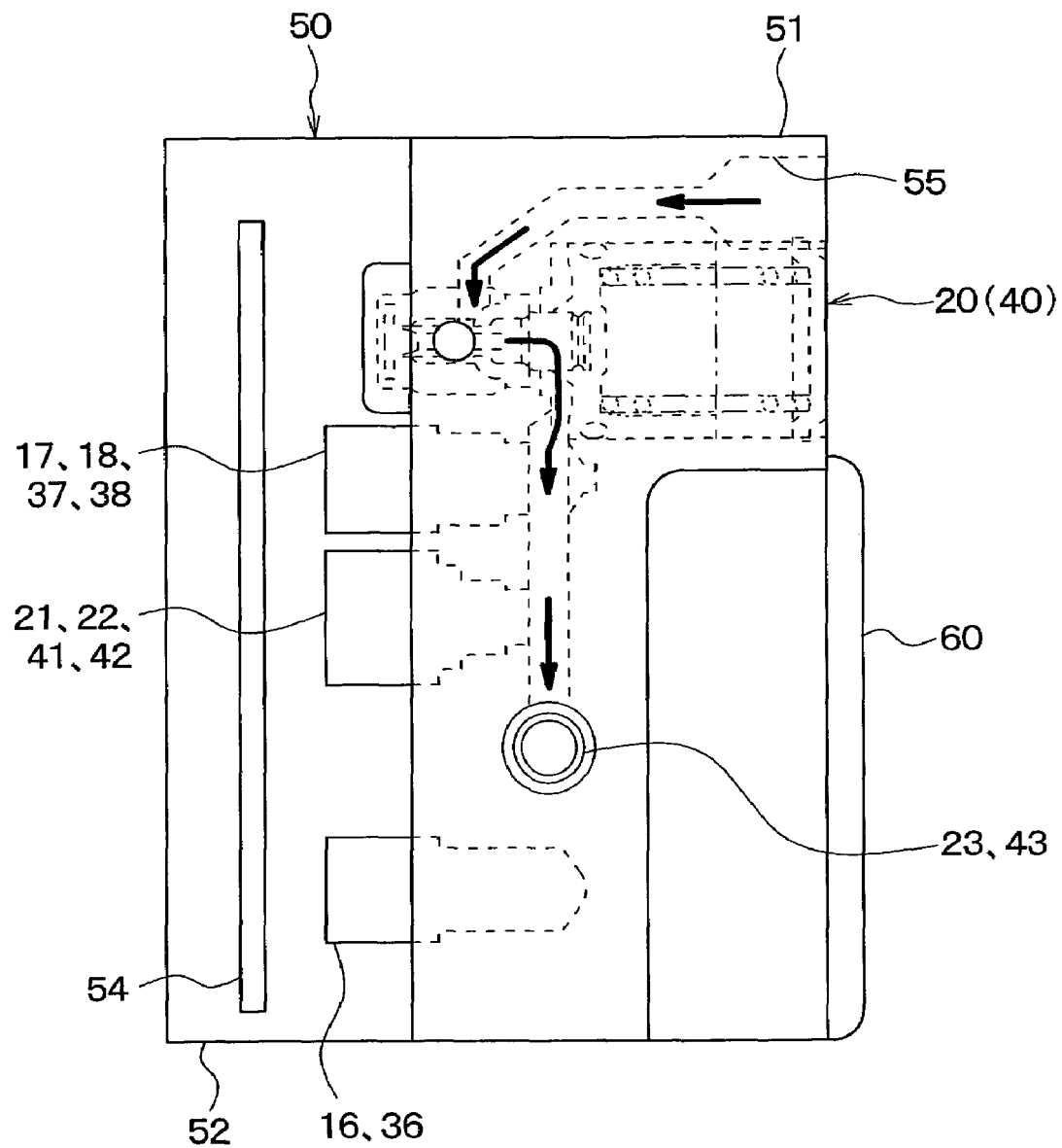
FIG. 3 shows the layout of the brake fluid pressure control actuator when viewed from the right side of FIG. 2.

The brake fluid pressure control actuator 50 is attached to the vehicle such that the up-down direction of the drawing sheets of FIGS. 2 and 3 is the same as the actual vertical direction of the vehicle.

As can be seen from FIGS. 2 and 3, the brake fluid pressure control actuator 50 has an aluminum housing (block) 51 that is formed with a substantially rectangular shape, the motor 60 attached to the housing 51, and a case 52.

The housing 51 is formed with a passage 53 for performance of brake fluid pressure control. This passage 53 configures the above-described brake conduits A to H. Further, the housing 51 houses (i) the first and the second differential pressure control valves 16 and 36, (ii) the first to fourth pressure increase control valves 17, 18, 37 and 38, (iii) the first to fourth pressure decrease control valves 21, 22, 41 and 42, (iv) the pumps 19 and 39, (v) the pressure regulating reservoirs 20 and 40, and (vi) the pressure sensor 70.

As shown in FIG. 2, (i) the first and the second differential pressure control valves 16 and 36, (ii) the first to fourth pressure increase control valves 17, 18, 37 and 38, and (iii) the first to fourth pressure decrease control valves 21, 22, 41 and 42 are positioned to a front surface side of the housing 51. More specifically, the first to fourth pressure increase control valves 17, 18, 37 and 38 are positioned in a row that is slightly upward from the center of the housing 51. Beneath this row, the first to fourth pressure decrease control valves 21, 22, 41 and 42 are positioned in another row. Further, the first and the second differential pressure control valves 16 and 36 are positioned below the first to fourth pressure decrease control valves 21, 22, 41 and 42. The dampers 23 and 43 are disposed to either side of the first and the second differential pressure control valves 16 and 36.

The pumps 19 and 39 are positioned, when viewed from the front surface of the housing 51 between the row of the first to fourth pressure decrease control valves 21, 22, 41 and 42, and the row of first and the second differential pressure control valves 16 and 36, and are fitted respectively into left and right side surfaces of the housing 51. The pumps 19 and 39 are constituted by piston pumps in the present embodiment, and are driven by a drive shaft 60a of the motor 60 that is positioned between the pumps 19 and 39.

The pressure regulating reservoirs 20 and 40 are positioned in the vicinity of a port 55 that is provided at a rear surface side of the housing 51. More specifically, the pressure regulating reservoirs 20 and 40 are located slightly beneath the port 55. Note that, the housing 51 is formed with a protruding portion that protrudes at the area in which the pressure regulating reservoirs 20 and 40 are disposed. The pressure regulating reservoirs 20 and 40 are positioned, when viewed from the front surface of the housing 51, above the first to fourth pressure increase control valves 17, 18, 37 and 38. More specifically, the pressure regulating reservoirs 20 is located between the first and the second pressure increase control valves 17 and 18, and the pressure regulating reservoir 40 is located between the third and fourth pressure increase control valves 37 and 38.

The pressure sensor 70 is positioned at the front surface side of the housing 51. The pressure sensor 70 is fitted in the housing 51 so as to be positioned, when viewed from the front surface of the housing 51, between the pressure regulating reservoirs 20 and 40.

The case 52 houses a circuit board of the brake control ECU 4, and is intended to prevent water or the like from coming into contact with the various control valves. The case 52 is fixed to the front surface side of the housing 51, and covers the various control valves, the pressure sensor 70, and the like.

The motor 60 is fixed to a bottom surface of the housing 51, with the drive shaft 60a inserted into the housing 51 such that the pumps 19 and 39 can be driven thereby.

Further, the port 55, which connects with the M/C 13, is provided in the housing 51. In addition, four ports 56 that connect the passage 53 to the W/Cs 14, 15, 34 and 35 (not shown in detail in FIG. 2) are also provided in the housing 51. The port 55 connected to the M/C 13 is formed in the upper portion of the rear surface of the housing 51. The four ports 56 connected to the W/Cs 14, 15, 34 and 35 are formed in a row in the upper surface of the housing 51.

The brake fluid pressure control actuator 50 and the brake fluid pressure control system 1 including the brake fluid pressure control actuator 50 are configured with the above described structure.

In this brake fluid pressure control system 1, the brake fluid pressure control actuator 50 is positioned at a predetermined position within the vehicle, and the M/C 13 that supplies brake fluid to the brake fluid pressure control actuator 50 is also positioned at a predetermined position in the vehicle. Accordingly, a height of the installation position of the M/C 13 and a height of the installation position of the brake fluid pressure control actuator 50 are determined by a specific height of the vehicle.

Figure 4:
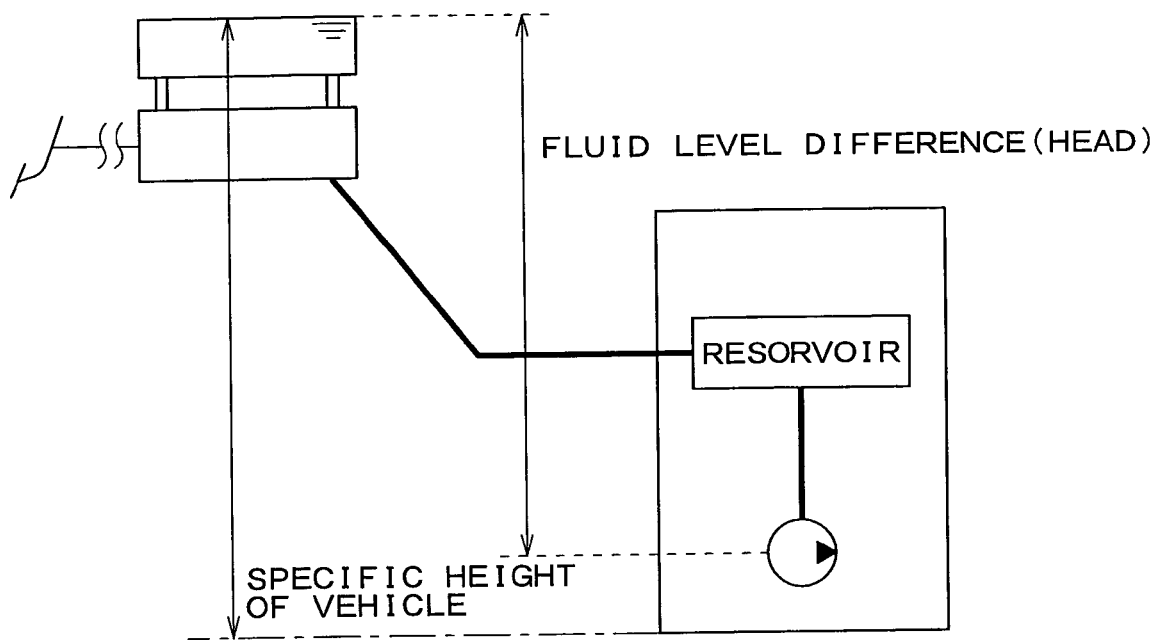
FIG. 4 is a schematic view of the relationship of a fluid level difference between an M/C and pressure regulating reservoirs, and pumps.

Given this, in the case of the present embodiment, the relationship of a fluid level difference (head) between the M/C 13 and the pressure regulating reservoirs 20 and 40 and the pumps 19 and 39 is as shown in FIG. 4.

With the brake fluid pressure control system 1 of the present embodiment, when the brake fluid in the M/C 13 is sucked up by the pumps 19 and 39, and, for example, used to pressurize the W/Cs 14, 15, 34 and 35, the brake fluid in the M/C 13 is sucked up to the pumps 19 and 39 along the route shown by the arrows in FIG. 3.

The structure of the brake fluid pressure control actuator 50 of the present embodiment is such that the pressure regulating reservoirs 20 and 40 are positioned toward the top of the housing 51, and the pumps 19 and 39 are positioned downward from the pressure regulating reservoirs 20 and 40. By positioning the pressure regulating reservoirs 20 and 40 in an upper portion of the housing 51, it is possible to provide free installation space in a lower portion of the housing 51 for positioning of the pumps 19 and 39. By adopting this configuration, it is possible to locate the pumps 19 and 39 as far as possible toward the bottom of the housing 51.

Accordingly, the fluid level difference (head) of the M/C 13 and the pumps 19 and 39 is large. Thus, even if self suction pumps that perform pumping with the assistance of the brake fluid pressure of the upstream side are utilized for the pumps 19 and 39, it is possible for the pumps 19 and 39 to utilize this fluid level difference (head) to improve pressure increase responsiveness.

In this manner, the brake fluid pressure control actuator 50 described in the present embodiment utilizes the fluid level difference of the M/C 13 and the pumps 19 and 39 to enable improved pressure increase responsiveness of the pumps 19 and 39. In particular, even at low temperatures when the brake fluid pressure control actuator has not warmed up, it is possible to make it easier for brake fluid to be sucked up, and improve pressure increase responsiveness.

Second Embodiment

Figure 5:
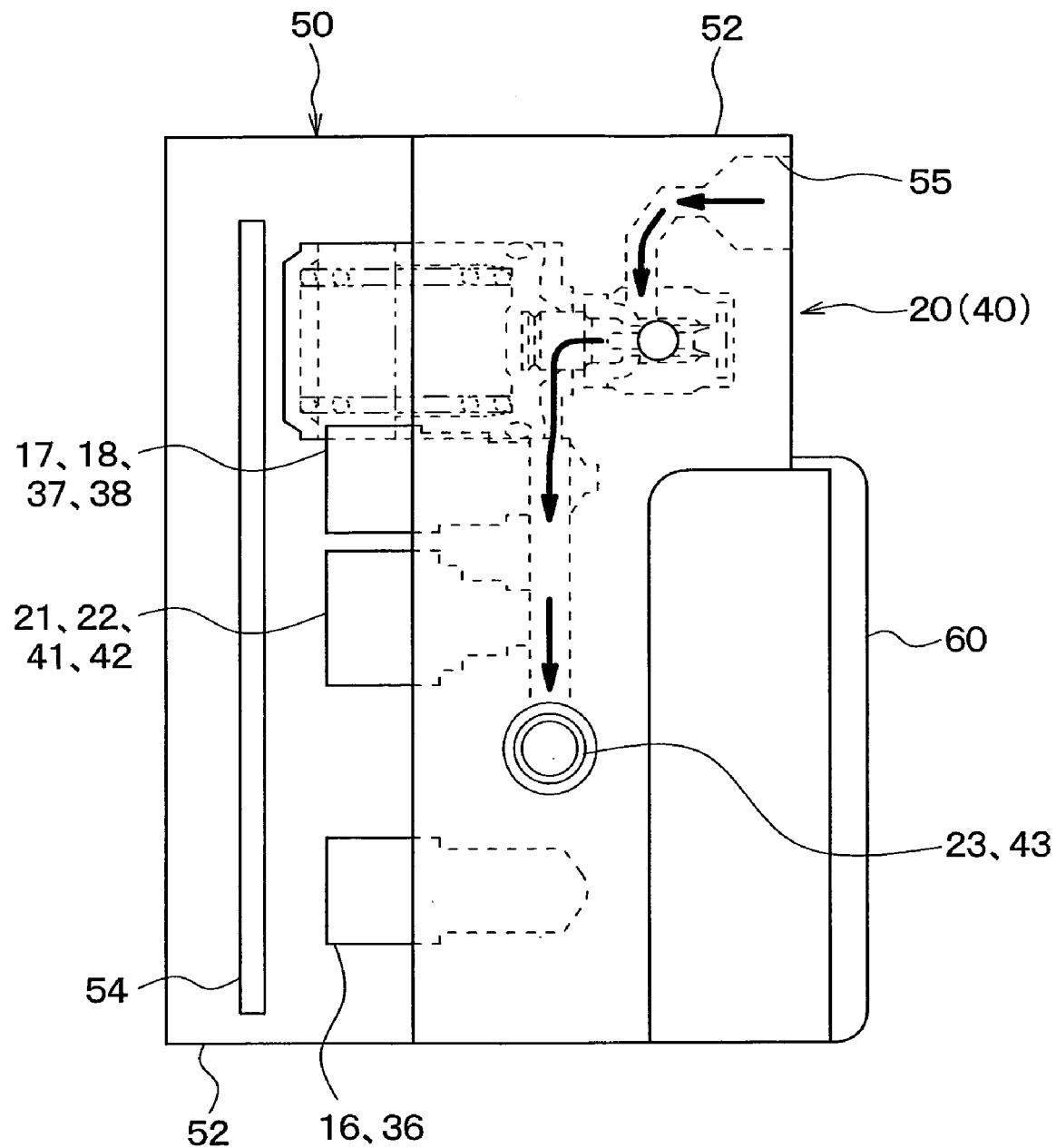
FIG. 5 shows the layout of a brake fluid pressure control actuator used in a brake fluid pressure control system of a second embodiment of the present invention from the right side.

Next, a second embodiment of the present invention will be described. FIG. 5 shows the layout arrangement of the brake fluid pressure control actuator 50 used in the brake fluid pressure control system 1 of this embodiment of the present invention. FIG. 5 corresponds to the layout of the brake fluid pressure control actuator 50 of the first embodiment viewed from the right side (as shown in FIG. 3). Hereinafter, the brake fluid pressure control actuator 50 provided in the brake fluid control system 1 of the present embodiment will be described. It should be noted that since the details of the brake fluid pressure control actuator 50 other than the layout arrangement are the same as those of the first embodiment, the explanation given here will only focus on the changed portions.

As shown in FIG. 5, in the brake fluid pressure control actuator 50 of the present embodiment, the pressure regulating reservoirs 20 and 40 are also positioned at the front surface side of the housing 51. Further, portions of the pressure regulating reservoirs 20 and 40 that protrude outwards from the housing 51 are housed in the case 52.

With this configuration, the pressure regulating reservoirs 20 and 40 are not positioned toward the back surface of the housing 51, and thus it is possible to reduce the length of the protruding portion of the housing 51 to this extent. In other words, it is possible to reduce the length of the housing 51 in a direction perpendicular to its front surface, namely, the width of the housing 51. As a result, it is possible to promote size reduction of the housing 51, and by corollary size reduction of the brake fluid pressure control actuator 50.

Note that, if, as in the first embodiment, the pressure regulating reservoirs 20 and 40 are disposed in the vicinity of the port 55 connected to the M/C 13, the pressure regulating reservoirs 20 and 40 may become an obstruction when the brake conduit is connected to the port 55. However, by disposing the pressure regulating reservoirs 20 and 40 at a different surface of the housing 51 to that in which the port 55 is formed, it is possible to avoid this type of problem.

Third Embodiment

Next, a mounting structure for mounting the brake fluid pressure control actuators 50 according to the first and second embodiments in a vehicle will be described.

Figure 6A:
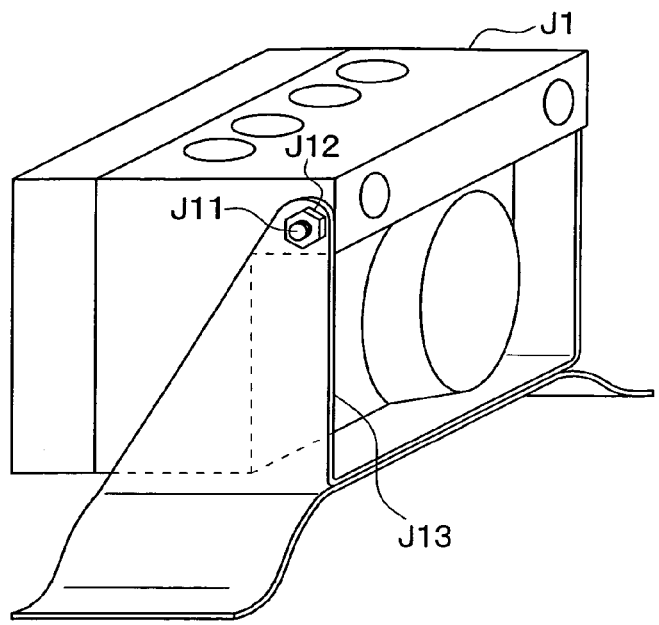
FIG. 6A is a perspective view showing a mounting structure for a brake fluid pressure control actuator of a related art.
Figure 6B:
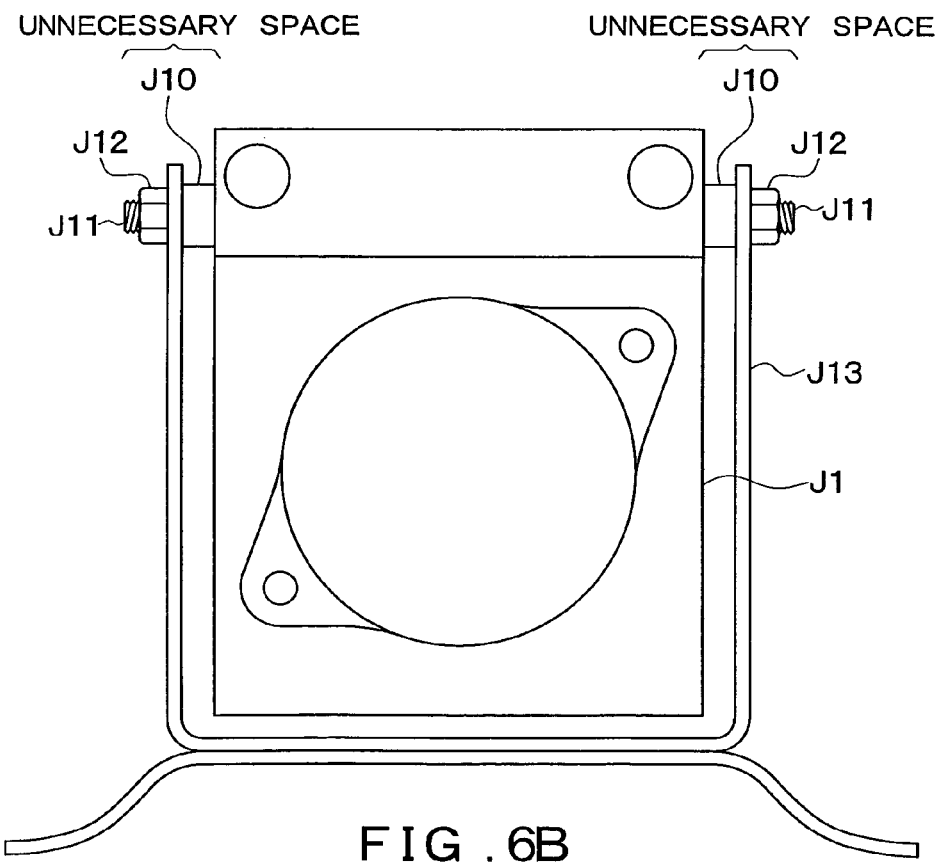
FIG. 6B shows a front view of FIG. 6A.
Figure 7B:
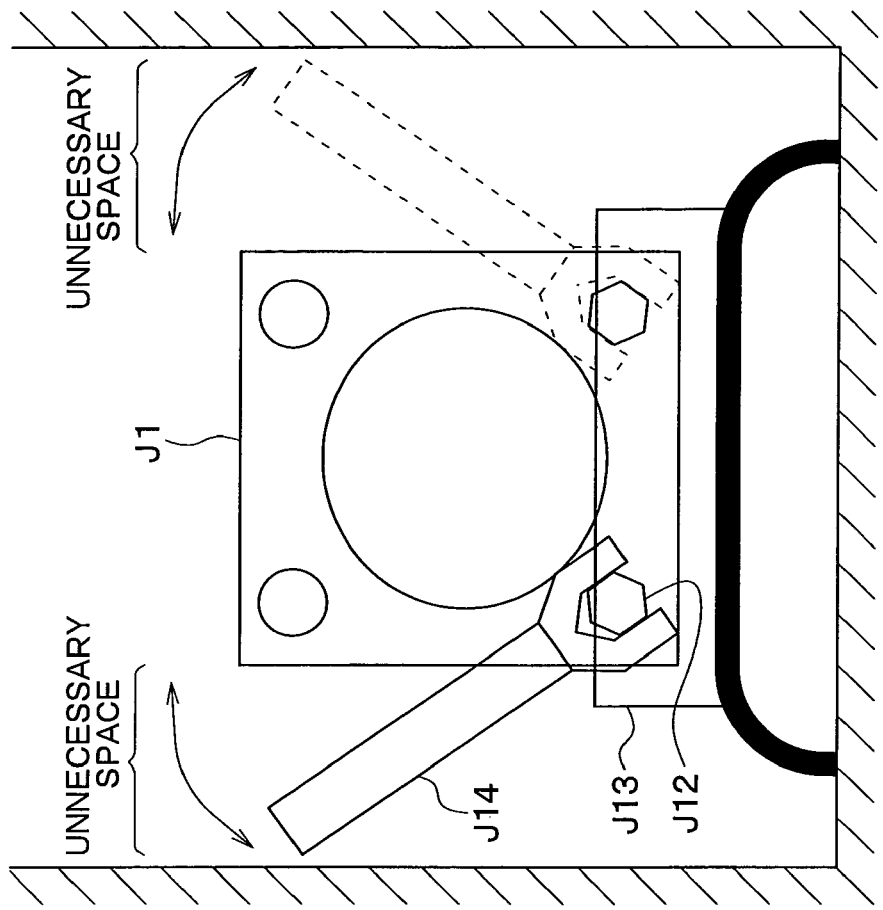
FIG. 7B is a front view of FIG. 7A.
Figure 7A:
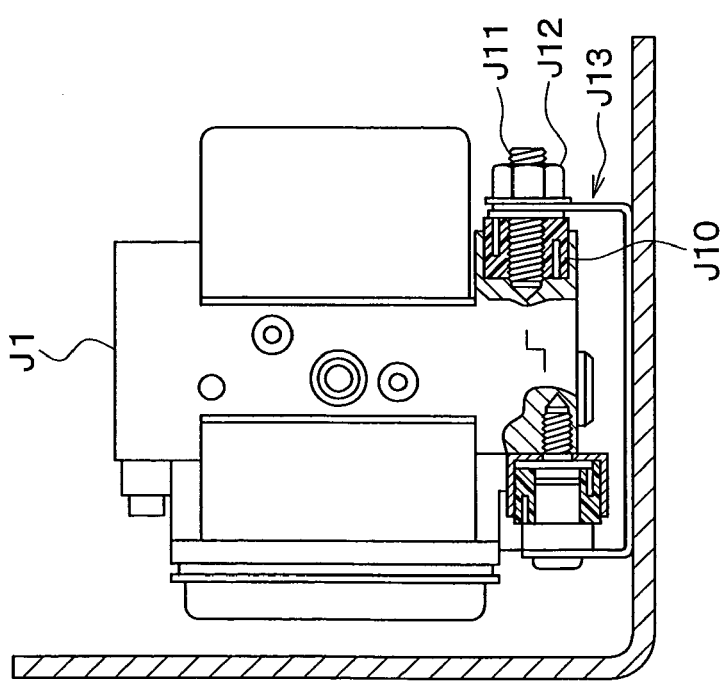
FIG. 7A is a side view of another mounting structure for the brake fluid pressure control actuator of a related art.

FIGS. 6 and 7 show two respective examples of a mounting structure for mounting a known brake fluid pressure control actuator in a vehicle. More particularly, FIG. 6A is a perspective view of one of the mounting structures, and FIG. 6B shows a front view thereof; and FIG. 7A is a side view showing the other one of the mounting structures, and FIG. 7B is a front view thereof. Note that, the up-down direction of the drawing sheets of FIGS. 6 and 7 corresponds to the actual vertical direction.

In the case of the example shown in FIGS. 6A and 6B, the known brake fluid pressure control actuator is attached at both sides of a housing J1 (the left and right sides of FIG. 6B) to a bracket J13 using mounting-use resin members J10, screws J11, and nuts J12. The brake fluid pressure control actuator is then mounted on the vehicle body using the bracket J13.

Alternatively, in the example shown in FIGS. 7A and 7B, the known brake fluid pressure control actuator is attached to the bracket J13 at a position of the housing J1 that is lower than the motor J2 using the resin members J10, the screws J11, and the nuts J12. The brake fluid pressure control actuator is then mounted on the vehicle body using the bracket J13.

Note that, when the brake fluid pressure control actuator is mounted on the vehicle body, it is necessary to position the other structural elements, walls, and the like, such that there is space for turning the nuts J12.

Further, in the case of the mounting structure shown in FIG. 6, in addition to space for positioning the resin members J10 and the nuts J12, it is necessary to take into account the need for space to make room for disposing the screws J11 at both sides of the housing J1.

Moreover, in the case of the mounting structure shown in FIG. 7, a wrench J14 is inserted from the top of an engine room, and the nuts J12 are turned. Accordingly, it is necessary to bear in mind the amount of space needed to turn the wrench J14.

As a result, when the brake fluid pressure control actuator is mounted in the engine room, regardless of which the mounting structures shown in FIGS. 6 and 7 is adopted, it is necessary to make reasonable space (refer to FIGS. 6B and 7B) to either side of the brake fluid pressure control actuator. As a result, the amount of wasted space increases, and it is not possible to adequately promote effective utilization of the space within the engine room.

The present embodiment provides a mounting structure for a brake fluid pressure control actuator that aims to promote efficient utilization of the space within an engine room.

Figure 8:
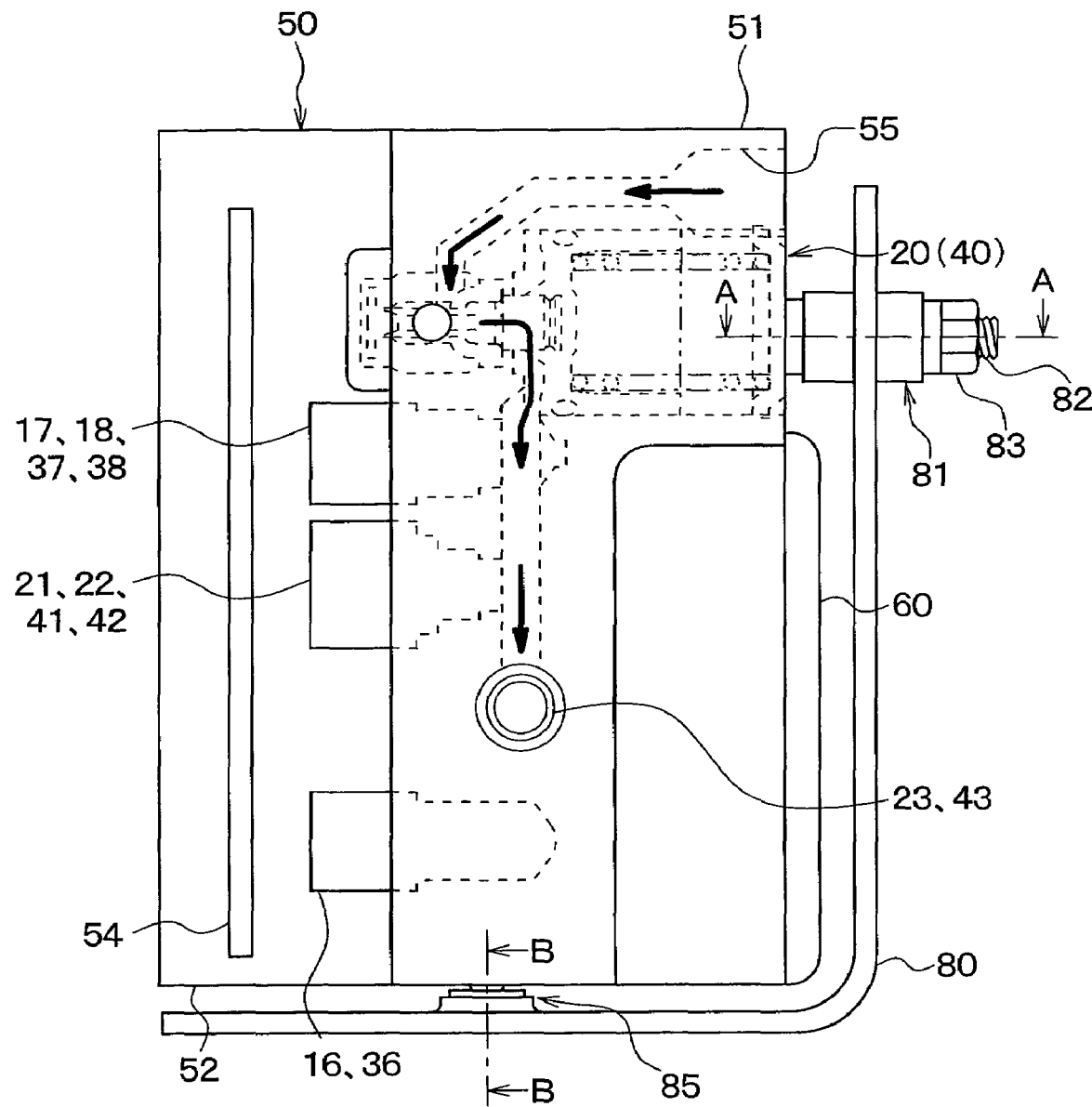
FIG. 8 is a schematic view showing the mounted state of a brake fluid pressure control actuator of a third embodiment of the invention in cross section.
Figure 9:
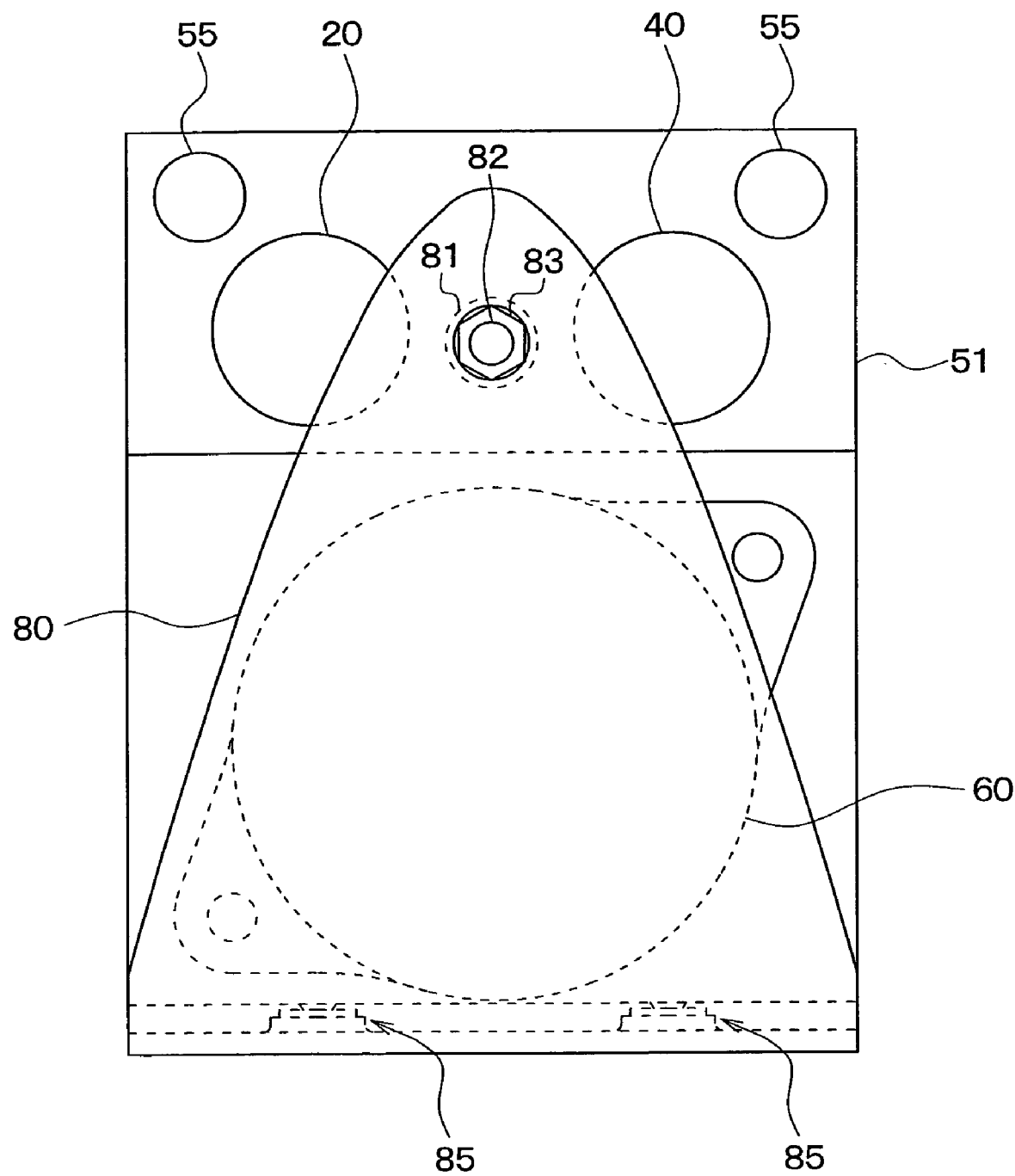
FIG. 9 is a left side view of FIG. 8.
Figure 10:
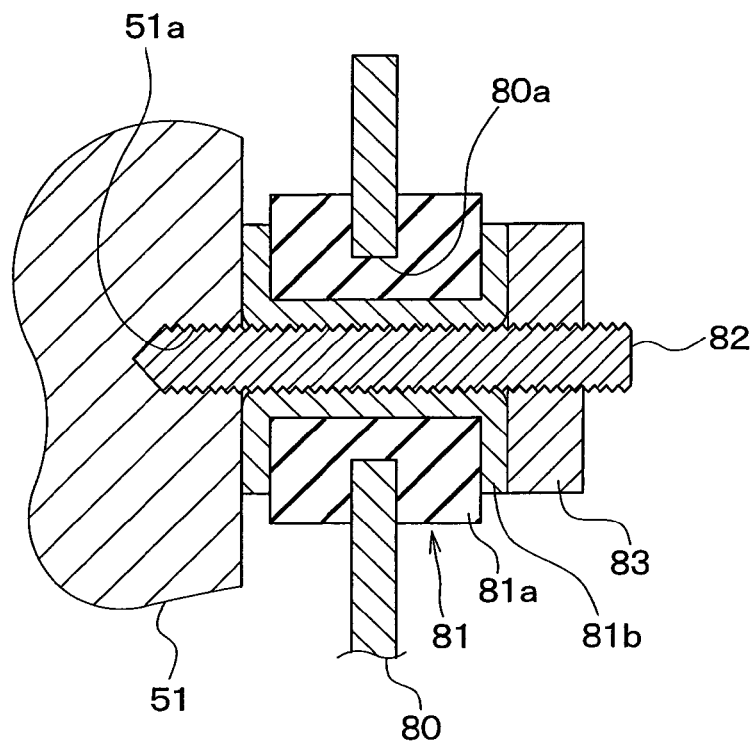
FIG. 10 is a cross section view taken along line A-A of FIG. 8.
Figure 11:
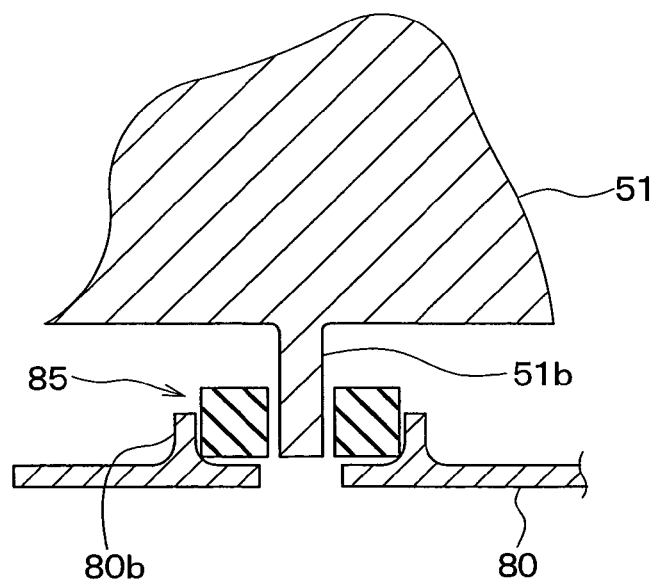
FIG. 11 is a cross section view taken along line B-B of FIG. 8.
Figure 12:
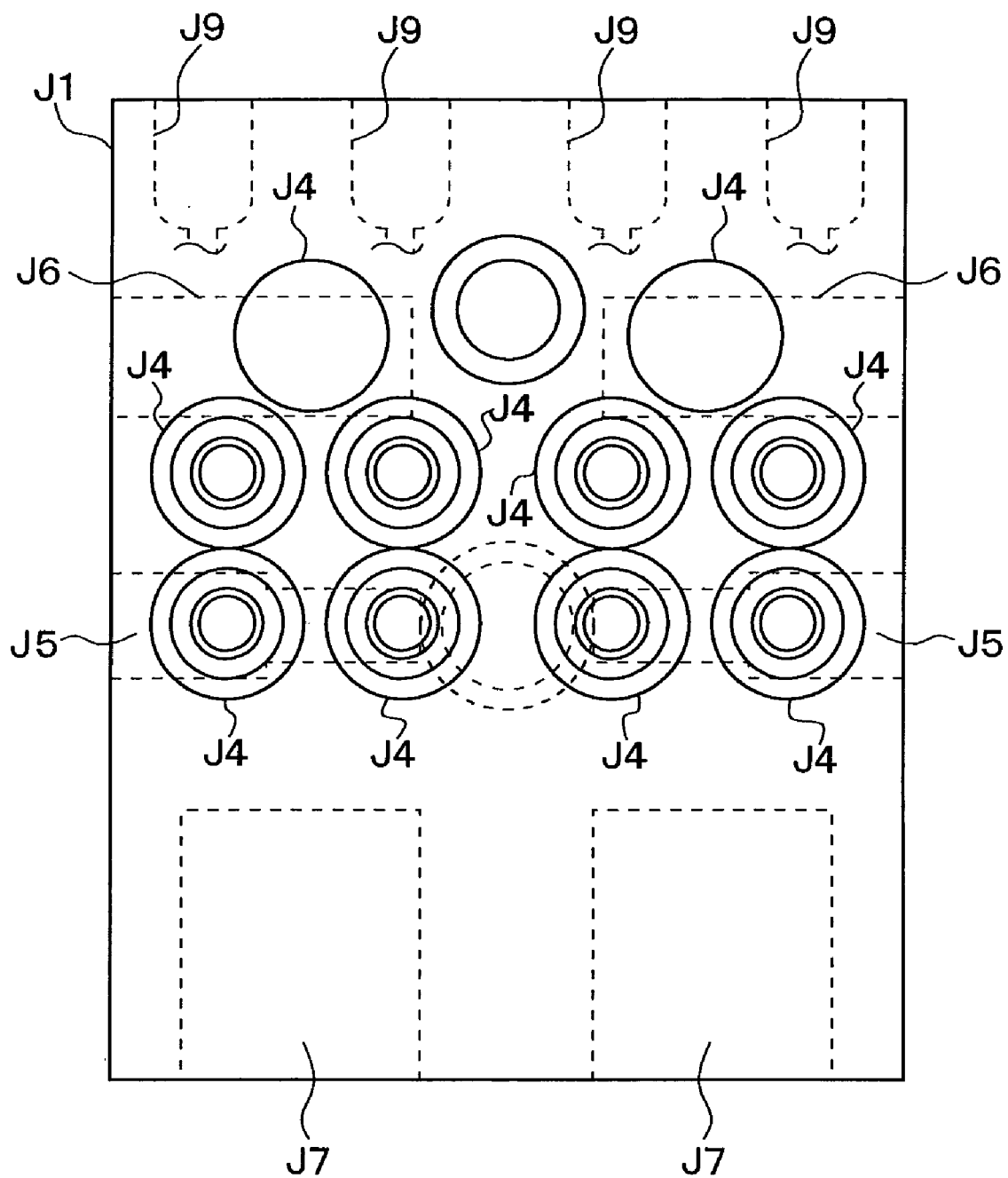
FIG. 12 is a front view of the layout of a brake fluid pressure control actuator of a related art.
Figure 13:
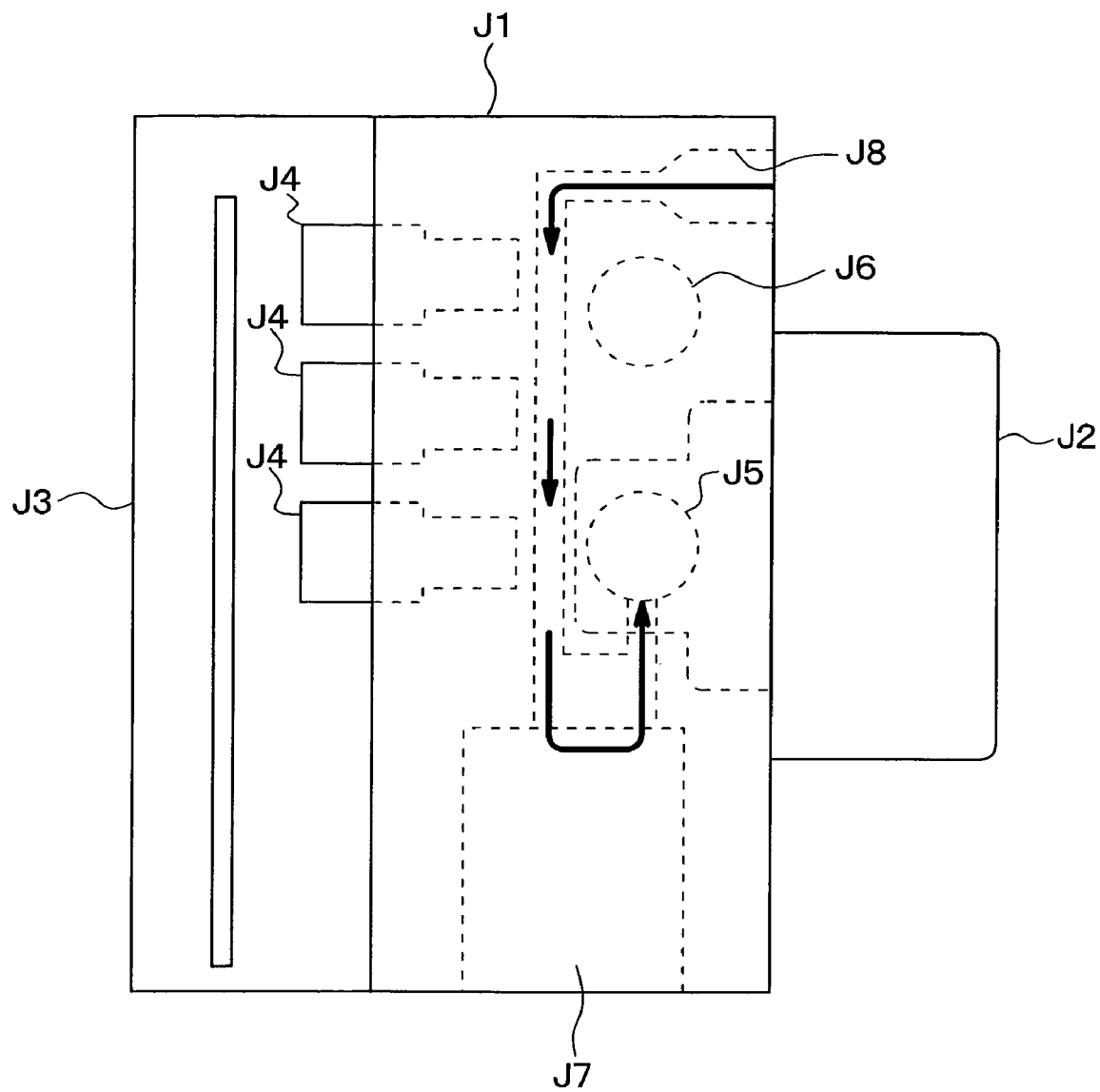
FIG. 13 shows the layout of the brake fluid pressure control actuator of FIG. 12 from the right hand side thereof.
Figure 14:
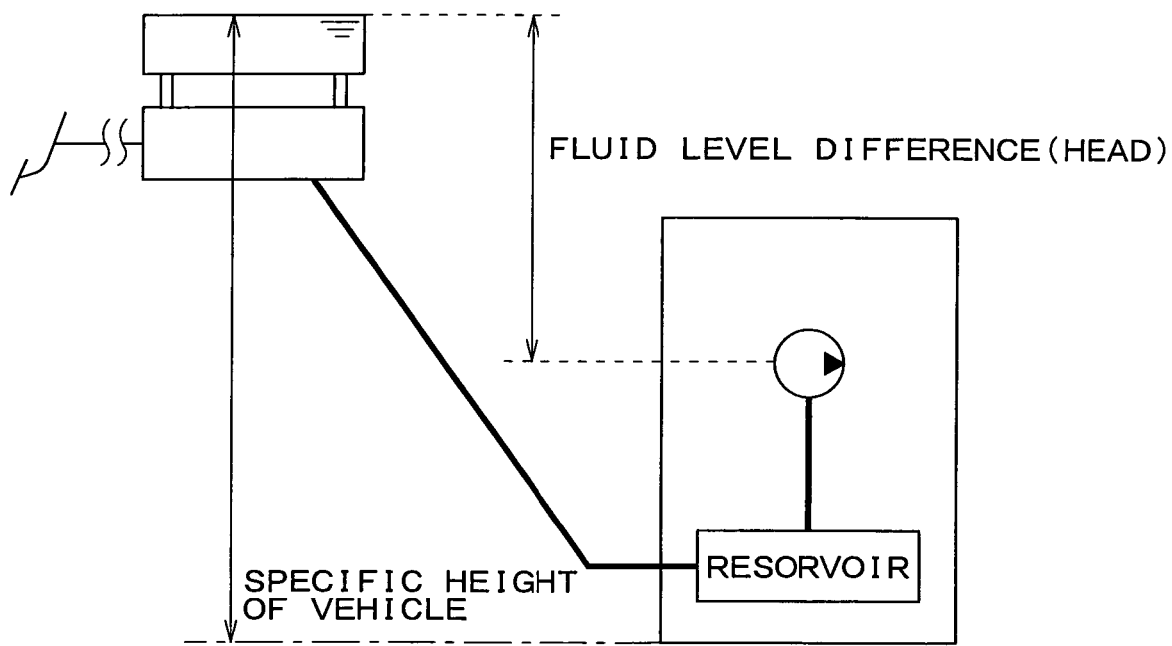
FIG. 14 is a schematic view showing the relationship of a fluid level difference between an M/C and reservoirs, and pumps.

FIG. 8 is a schematic cross sectional view showing the mounting structure for the brake fluid pressure control actuator 50; FIG. 9 is a left side view of FIG. 8; FIG. 10 is a cross sectional view taken along line A-A of FIG. 8; and FIG. 11 is a cross sectional view taken along line B-B of FIG. 8.

As can be seen from FIG. 8, a V-shaped bracket 80, which is directly fixed to the vehicle body (not shown) is used to fix the brake fluid pressure control actuator 50 to the vehicle body. This bracket 80 has two surfaces that respectively face (a) the surface of the housing 51 to which the motor 60 is attached, and (b) the bottom surface of the housing 51. As is apparent from FIG. 9, the surface that faces the surface of the housing 51 to which the motor 60 is attached has a substantially triangular shape, and the surface that faces the bottom surface of the housing 51 has a substantially square shape.

Moreover, the brake fluid pressure control actuator 50 is fixed to the housing 51 at a point above the motor 60 by the bracket 80 using a mounting portion 81, a screw 82 and a nut 83. More specifically, the brake fluid pressure control actuator 50 is fixed to the protruding portion of the housing 51 in which the pressure regulating reservoirs 20 and 40 are disposed.

In particular, as can be seen from FIG. 10, a female screw hole 51a is formed in a portion of the housing 51 to correspond with the tip end of the screw 82. The screw 82 is screwed into this female screw hole 51a. Further, a hole 80a is formed in the bracket 80. The screw 82 is inserted through this hole 80a. The mounting portion 81 is fixed by press fitting in the hole 80a.

The mounting portion 81 is formed from a rubber portion 81a with a hollow and a metal portion 81b that is inserted in the hole 80a of the bracket 80. Further, the screw 82 is inserted in a hollow central portion of the metal portion 81b, and the nut 83 is fitted and screwed onto a section of the screw 82 that protrudes from the mounting portion 81. By doing so, the brake fluid pressure control actuator 50 is fixed to the bracket 80.

Referring to FIG. 11, a protrusion 51b is formed on the bottom surface of the housing 51, and this protrusion 51b is inserted in a hollow central portion of a cylindrical mount 85 that is housed within a holding portion 80b formed in the bracket 80. (Note that, as can be seen from FIG. 9, two of the mounts 85 are provided.) As a result of this configuration, movement of the brake fluid pressure control actuator 50 with respect to the bracket 80 is regulated in a direction parallel to the bottom surface of the housing 51.

In other words, the brake fluid pressure control actuator 50 is fixed to the bracket 80 by just the surface of the housing 51 to which the motor 60 is attached, while, at the bottom surface of the housing 51, the protrusion 51a is simply inserted in the hollow central portion of the mount 85 housed in the holder 80b of the bracket 80.

With the above described structure, the brake fluid pressure control actuator 50 is fixed to the bracket 80, whereby the brake fluid pressure control actuator 50 is fixed to the vehicle body via the bracket 80. With this configuration it is only necessary to tighten the nut 83 on the surface of the bracket 80 facing the surface of the housing 51 to which the motor 60 is fixed in order to fix the brake fluid pressure control actuator 50 to the bracket 80. However, there is no need to tighten any screws in any other locations.

Accordingly, the amount of space that must be provided for inserting a tool like a wrench to tighten the nut 83 is small. Further, the need to allow space for moving the wrench is taken into consideration since the basic form of the configuration incorporates space to move the wrench in the width direction of the brake fluid pressure control actuator 50 in the left-right direction of FIG. 9. Accordingly, there is no need to separately provide space to allow for movement of the wrench.

Further, the brake fluid pressure control actuator 50 is fixed to the bracket 80 at the surface of the housing 51 at which the pressure regulating reservoirs 20 and 40 are disposed, namely, the surface where a brake hose (not shown) is fixed to the port 55 connected to the M/C 13. The basic form of the configuration is such that this surface is used for fixing the brake hose, and thus it is necessary to provide space for fixing of the brake hose. Thus, even if the screw 82, the mounting portion 81, and the nut 83 are disposed on the surface too, it is not the case that it will be necessary to provide an excessive amount of space for them.

Accordingly, it is possible to promote effective utilization of the space within the engine room as compared to known mounting structures. For example, as compared to the mounting structure shown in FIG. 6 in which the brake fluid pressure control actuator is fixed to the bracket J13 at two positions on either side thereof, in the present embodiment the brake fluid pressure control actuator 50 is fixed at only one position on one side. Accordingly, it is possible to reduce the amount of space required to this extent.

Further, in the mounting structure shown in FIG. 7 it is necessary to take into consideration the amount of space required to turn the wrench J14 when fixing the nut J12. However, in comparison, in the present embodiment the wrench is turned using movement space that exists in the basic form of the configuration, and thus it is not necessary to provide any dedicated space for this purpose. Accordingly, it is possible to reduce the amount of space required still further.

Moreover, in the present embodiment, as is apparent from FIG. 11, the configuration is such that the holding portion 80b of the bracket 80 and the protrusion 51a of the housing 51 do not contact as a result of the mount 85. Accordingly, it is possible to provide a configuration which inhibits operation vibration of the brake fluid pressure control actuator 50 from being transmitted to the bracket 80, and by corollary the vehicle body.

Other Embodiments

In the above described embodiments, the pressure regulating reservoirs 20 and 40 are positioned such that a longitudinal direction of the pressure regulating reservoirs 20 and 40, namely, a sliding direction of the pistons 20g and 40g, is the same as a width direction of the housing 51 which equals to the direction perpendicular to the front surface of the housing 51. However, this is merely one possible example of the configuration, and the pressure regulating reservoirs 20 and 40 may be positioned, for example, in line with the actual vertical direction. However, in this case, the length of the housing 51 in the vertical direction is extended resulting in an increase in the size of the housing 51. Accordingly, the configurations of the above described embodiments are preferable.

In addition, in the above described embodiments, as reservoirs, the pressure regulating reservoirs 20 and 40 including the pressure regulating valves are provided. However, this is merely an example, and it is not essential to utilize pressure regulating reservoirs.

Moreover, in the above described embodiments, an example of a brake fluid pressure control actuator having ten control valves is described. However, this number of control valves is merely an example, and a brake fluid pressure control actuator having less than or more than ten control valves may be adopted.

Further, the above described third embodiment has a configuration in which the mounting portion 81 is press fitted in the hole 80a of the bracket 80. However, instead of this configuration, for example, a slit may be provided in the bracket 80 and the mounting portion 81 may be inserted in this slit.

Furthermore, the third embodiment describes one example of how the brake fluid pressure control actuator 50 may be fixed to the bracket 80. However, the invention is in no way restricted to this type of fixing structure. For example, a fixing structure is described above using the screw 82 and the nut 83, but instead the female screw hole 51 may be drilled deeper, and a headed screw may be screwed therein.

Further, the above described configuration provides a movement regulation mechanism for the brake fluid pressure control actuator 50 with respect to the bracket 80 at the bottom surface of the housing 51. However, this is merely one example, and the present invention is not limited to this type of fixing structure. Moreover, an example is described in which the mounts 85 are provided at two locations for fixing the brake fluid pressure control actuator 50 with respect to the bracket 80. However, the configuration may include a mount at just one location, or mounts at three or more locations.

While the above description is of the preferred embodiments of the present invention, it should be appreciated that the invention may be modified, altered, or varied without deviating from the scope and fair meaning of the following claims.

What is claimed is:

1. A brake fluid pressure control actuator comprising:
   a housing having a front surface and a back surface, the housing being formed with a passage connecting a master cylinder and a wheel cylinder, and a port connecting the passage to the master cylinder;
   a plurality of control valves for controlling brake fluid pressure applied to the wheel cylinder, the control valves being positioned at the front surface of the housing;
   a reservoir positioned in the housing and connected to the passage; and
   a pump positioned in the housing, the pump sucking up brake fluid from the master cylinder via the port, and discharging brake fluid toward the wheel cylinder via the passage, wherein
   the reservoir is positioned in a vicinity of the port connected to the master cylinder, and the pump is positioned at a position below the reservoir,
   the reservoir is connected to a suction port of a pump to supply the brake fluid to the suction port of the pump,
   the plurality of control valves include four pressure increase control valves positioned in a row, and four pressure decrease control valves positioned in a row, the respective rows being aligned with each other,
   the reservoir is positioned above the rows of the four pressure increase control valves and the four pressure decrease control valves, and
   the pump is positioned below the rows of the four pressure increase control valves and the four pressure decrease control valves.

2. The brake fluid pressure control actuator according to claim 1, wherein the reservoir is positioned such that a longitudinal direction thereof is aligned with a direction perpendicular to the front surface of the housing.

3. The brake fluid pressure control actuator according to claim 2, further comprising: a case that covers the plurality of control valves in the front surface of the housing, wherein the reservoir is positioned at a side of the front surface of the housing, and a portion of the reservoir that protrudes from the housing is housed within the case.

4. The brake fluid pressure control actuator according to claim 1, wherein
   the port connected to the master cylinder is formed in a surface of the housing, and
   the housing is only fixed at the surface to a bracket and is attached to a vehicle body via the bracket.

5. A brake fluid pressure control actuator according to claim 4, wherein the port connected to the master cylinder is provided as two ports that are formed at different positions in the housing, the housing being fixed to the bracket at a point between the two ports.

6. The brake fluid pressure control actuator according to claim 4, wherein the bracket is formed with one of a hole and a slit, a mount with a hollow central portion is fitted in one of the hole and slit, and a screw is inserted in the hollow central portion, the screw being screwed into a female screw hole formed in the housing whereby the housing is fixed to the bracket.

7. The brake fluid pressure control actuator according to claim 4, further comprising: a movement regulation mechanism provided at, at least one of, a bottom surface of the housing and a surface of the bracket that faces the bottom surface of the housing, the movement regulation mechanism regulating movement of the housing with respect to the bracket in a direction parallel to a bottom surface of the housing.

8. The brake fluid pressure control actuator according to claim 7, wherein
   the movement regulation mechanism is provided with: a protrusion formed on the bottom surface of the housing; a holding portion formed in the bracket; and a mount which is positioned between the protrusion and the holding portion and into which the protrusion is inserted, and the protrusion and the holding portion are kept apart by the mount.

9. The brake fluid pressure control actuator according to claim 1, wherein the reservoir is located between the master cylinder and the pump in the passage connecting the master cylinder and the wheel cylinder.

* * * * *